United States Patent
Becker et al.

(10) Patent No.: US 6,761,263 B2
(45) Date of Patent: Jul. 13, 2004

(54) METHOD FOR CONTROLLING THE RUN-UP OF A CONVEYOR BELT AND DRIVE DEVICE FOR A CONVEYOR BELT

(75) Inventors: Norbert Becker, Röttenbach (DE); Ingemar Neuffer, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/181,181

(22) PCT Filed: Jan. 5, 2001

(86) PCT No.: PCT/DE01/00026

§ 371 (c)(1),
(2), (4) Date: Sep. 30, 2002

(87) PCT Pub. No.: WO01/53174

PCT Pub. Date: Jul. 26, 2001

(65) Prior Publication Data

US 2003/0075417 A1 Apr. 24, 2003

(30) Foreign Application Priority Data

Jan. 21, 2000 (DE) .......................... 100 02 563

(51) Int. Cl.$^7$ .............................................. B65G 43/00
(52) U.S. Cl. ............... 198/810.01; 198/832; 198/502.4; 198/577
(58) Field of Search .......................... 198/810.01, 832, 198/502.4, 577; 318/568.18

(56) References Cited

U.S. PATENT DOCUMENTS 5,826,406 A * 10/1998 Massey ...................... 53/467
6,292,710 B1 * 9/2001 Bonnet ....................... 700/230

* cited by examiner

*Primary Examiner*—Richard Ridley
(74) *Attorney, Agent, or Firm*—Baker Botts LLP

(57) ABSTRACT

A method for controlling the run-up of a conveyor belt BY increasing a setpoint value of the belt's speed with an increasing acceleration in a first time interval, and with a decreasing acceleration in a second time interval, thereafter plotting a curve of the increasing acceleration against time which has a positive curvature in the second interval, a second time derivative of the acceleration in the first and the second time interval is at least approximately constant and at least approximately equal and opposite.

9 Claims, 5 Drawing Sheets

METHOD FOR CONTROLLING THE RUN-UP OF A CONVEYOR BELT AND DRIVE DEVICE FOR A CONVEYOR BELT

CROSS-REFERENCE TO RELATED APPLICATIONS

This is a national application for International Application No. PCT/DE01/00026 which was filed on Jan. 5, 2001 and which published in German on Jul. 26, 2001, which in turn claims priority from 100 02 563.3, which was filed on Jan. 21, 2000.

FIELD OF THE INVENTION

The invention relates to a method for controlling the run-up of a conveyor belt and to a drive device for a conveyor belt.

BACKGROUND OF THE INVENTION

Conveyor belt systems that are long in length, for example in the range of a few kilometers, have to be run-up and braked particularly gently, in order to avoid belt oscillations and excessively high belt tensions. The rotational speed of the drive motors is therefore controlled by a control device known as a soft run-up controller, in order to enable a gentle runup of the rotational speed. For example, "M. B. Singh, The Role of Drive System Technology in Maximizing the Performance and Economics of Long Belt Conveyors", bulk solids handling, vol. 14, 1994, pp. 695–702 discloses running-up the rotational speed of the drive drum and therefore the belt speed u* with a linearly rising acceleration a* in a first time interval. In order to end the acceleration phase, in a second time interval t2 the acceleration a* is reduced to zero. This reduction is likewise carried out linearly. In other words, the first time derivative r of the acceleration a* (referred to in specialist language as the jerk) is constant and positive in a first time interval t1, and likewise constant and negative in a second time interval t2. The curve of the rotational speed (or speed v* against time) is therefore formed by quadratic functions with inverse curvature which follow each other directly, that is to say in which the first time interval t1 with a rising acceleration a*, and the second time interval t2 with a falling acceleration a* follow each other directly.

The time curve used in the known method of the setpoint value of the acceleration a*, of the setpoint value of the speed v*, and of the first time derivative r of the setpoint value of the acceleration a* (jerk) is plotted in a graph in FIG. 4.

FIG. 5 is a graph of the motor torque M which results from the known method, and also the real head and tail speed, vk and vh, respectively, of a conveyor belt having a length of 5000 m, given a time duration of the first time interval and of the second time interval of 20 s, and a maximum standardized acceleration of 0.05 s−1, which occurs during a run-up operation. In this case, the standardized acceleration is to be understood as the ratio of the actual acceleration to the final speed of the belt. In the FIG. 5, it can be seen that significant fluctuations occur both in the motor torque M and in the conveyor belt itself In the case of long conveying lengths, this can lead to disruptive operating states.

It is also known to drive the band drive with an acceleration-time curve which runs in accordance with a sinusoidal curve. In this method, the acceleration is likewise increased continuously up to a maximum value, and reduced continuously from there. Here the first time derivative of the acceleration at the maximum, i.e., the jerk, is zero. Belt and torque fluctuations occur particularly at the end of the run-up in this method.

In both methods, the problem results that at the end of the run-up operation, overswings or underswings in the motor torque occur, which also result in a greater belt tension. Furthermore, in the case of the second method, it is not possible to move to a different rotational speed during the run-up with the same curve characteristic, since the curve characteristic is defined unambiguously by the run-up time, which is equal to the sum of the time duration of the first time interval and of the time duration of the second time interval, and of the predefined final speed.

SUMMARY OF THE INVENTION

The present invention provides a method and apparatus for controlling the run-up of a conveyor belt in which the aforementioned problems are largely avoided. In the novel method for controlling the run-up of a conveyor belt, the setpoint value of the belt speed is increased with a continuously increasing acceleration in a first time interval, and is increased with a continuously decreasing acceleration in a second time interval, with the curve of the acceleration plotted against the time having a positive curvature in the second time interval. Since, as a result of the positive, that is to say upwardly concave, curvature of the acceleration, the jerk decreases continuously in the second time interval, and belt oscillations at the end of the acceleration phase can largely be eliminated by a run-up program configured in this way.

In a preferred embodiment of the method according to the present invention, the first time derivative of the acceleration is at least approximately equal to zero at the end of the second time interval. This ensures that the conveyor belt moves particularly gently and softly to its final speed. More specifically, the second time derivative of the acceleration in the first and in the second time interval is in each case at least approximately constant, and equal and opposite. This measure makes it possible to interrupt the run-up program at any time and, during the run-up, it is possible to change the predefined final rotational speed or final speed, without resulting in a different characteristic of the acceleration-time curve.

The apparatus which facilitates the novel method is a drive device which contains a motor for driving a driving drum. A control device is assigned to the motor which permits the setpoint value of the belt speed to be controlled during the run-up of the conveyor belt in such a way that said belt speed increases continuously with continuously increasing acceleration in a first time interval, and decreases with a continuously decreasing acceleration in a second time interval. This occurs in such a way that the curve of the acceleration plotted against the time has a positive curvature.

BRIEF DESCRIPTION OF THE DRAWINGS

Further preferred embodiments of the drive device are disclosed hereinbelow in conjunction with the drawing, in which.

DETAILED DESCRIPTION OF THE INVENTION

Figure 1:
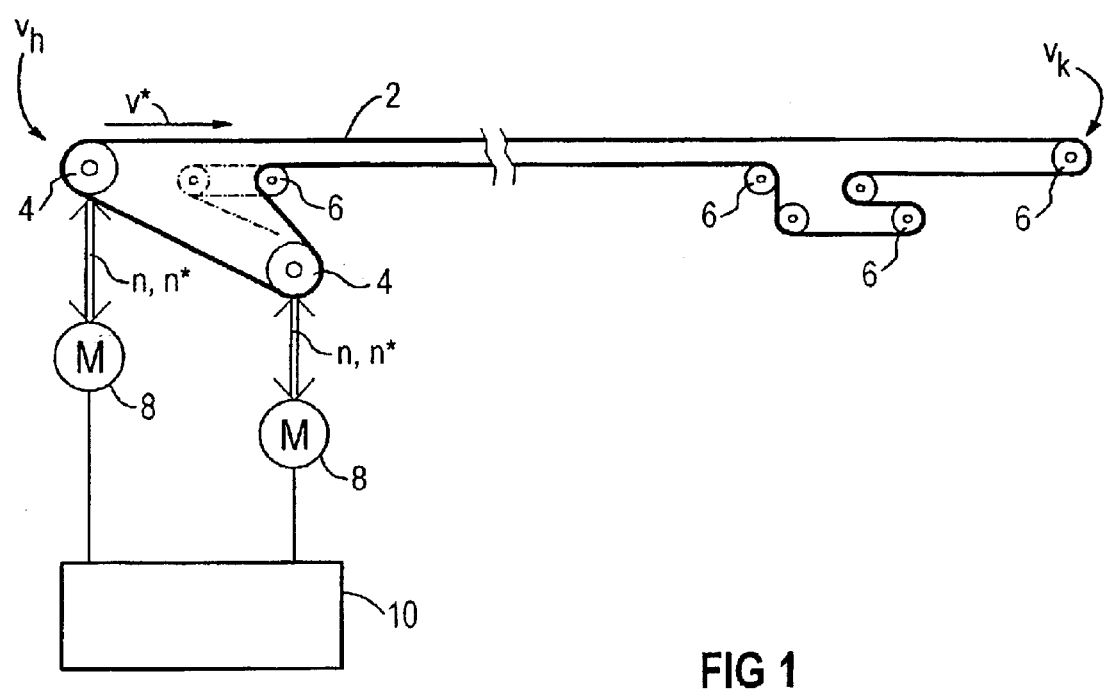
FIG. 1 illustrates a drive device according to the invention in a basis schematic form.

In FIG. 1, a conveyor belt 2 is driven by two driving drums 4. Deflection drums 6 are used to tension or deflect the conveyor belt 2. The driving drums 4 are assigned a motor 8, generally an electric motor. It is not necessary for each driving drum 4 to be driven by a separate motor 8, as shown in the illustrated exemplary embodiment.

As illustrated, the motors 8 are connected to a control device 10, which controls the motor rotational speed n to the set point value n* in accordance with a predefined run-up program. The setpoint value of the motor rotational speed n* is proportional, depending on the transmission ratio of the gearbox, to the setpoint value of the rotational speed of the driving rollers 4, which is in turn proportional to the setpoint value of the belt speed v* of the conveyor belt 2. In practice, during the run-up or braking, the setpoint value of the belt speed v*, predefined by the setpoint value of the motor rotational speed n*, does not correspond with the real belt speed vh and vk at the tail (drive side) or head (deflection drum at the end of the belt). This is because the conveyor belt 2 is not an ideal rigid body but in reality an elastically deformable body.

Figure 2:
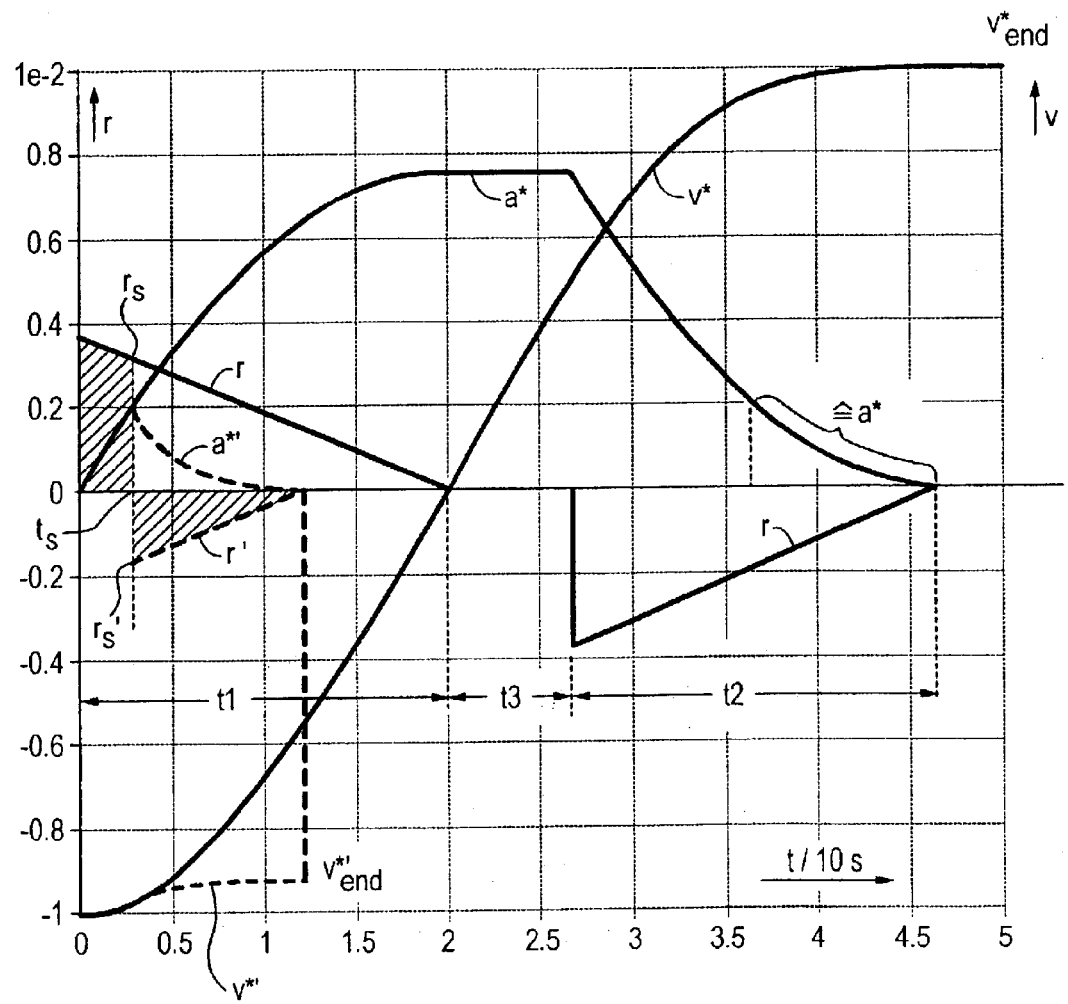
FIG. 2 illustrates a graph in which the setpoint value of the speed, the acceleration, and the first time derivative of the acceleration of the conveyor belt are in each case plotted against the time.

In FIG. 2, the acceleration a*, i.e., the first time derivative of the setpoint value of the speed v*, increases continuously with a constant convex curvature during the run-up, which reaches its maximum value at the end of a first time interval t1 (first jerk time). The acceleration a* plotted in FIG. 2 does not correspond to the real acceleration of the conveyor belt 2, but is only the differential of the predefined time curve of the setpoint value of the belt speed v*. The first time derivative of the acceleration a*, the jerk r, is positive and is reproduced by means of a straight line with a negative slope, which intersects the abscissa at the end of the first time interval t1. The second time derivative of the acceleration a* is therefore constant and negative, and the jerk r is equal to zero at the end of the first time interval t1.

In a second time interval t2, the acceleration operation is completed, the curve of the setpoint value of the acceleration a* having a positive, that is to say an upwardly concave curvature. The acceleration a* decreases continuously, and at the end of the second time interval t2 (second jerk time) reaches the abscissa tangentially. Hence the first time derivative of the acceleration a* is equal to zero at the end of the second time interval t1. Likewise, the speed setpoint v* ends gently in the final setpoint value v*end, the final setpoint value v*end being driven particularly gently by the jerk r decreasing continuously down to zero. The second time derivative of the acceleration a* is constant and positive in the second time interval. In the exemplary embodiment, the jerk r in the first time interval t1, and the jerk r in the second time interval t2 are in each case predefined by straight lines, with slopes that are equal and opposite.

Provided between the first time interval t1 and the second time interval t2 is a third time interval t3, in which the setpoint value of the belt speed v* increases linearly with a constant acceleration. Depending on the duration of the first jerk time t1 or of the third time interval t3, it is possible to move to any desired end speeds without changing the characteristic of the curve. This is illustrated in FIG. 2 by the curves drawn in dashed lines for a situation in which the first jerk time is ended at the time ts. The jerk r then jumps (in the ideal case) from a value rs to a value rs'. The second time derivative of the jerk r for t>ts is constant and, in terms of magnitude, is equal to the second time derivative of the jerk r for t<ts. The value rs' has to be determined in such a way that the time integral (hatched areas) over the jerk r vanishes. The reduction of the acceleration a*' to zero is then carried out with exactly the same curve as that which is also present in the end phase—the bracketed portion of the curve a*. Since the course of the end phase of the run-up according to the present invention has a constant curve shape, it is possible to drive to any desired final speeds vend*', and the run-up can be terminated at any time without changing the curve characteristic when moving towards the final speed.

Figure 3:
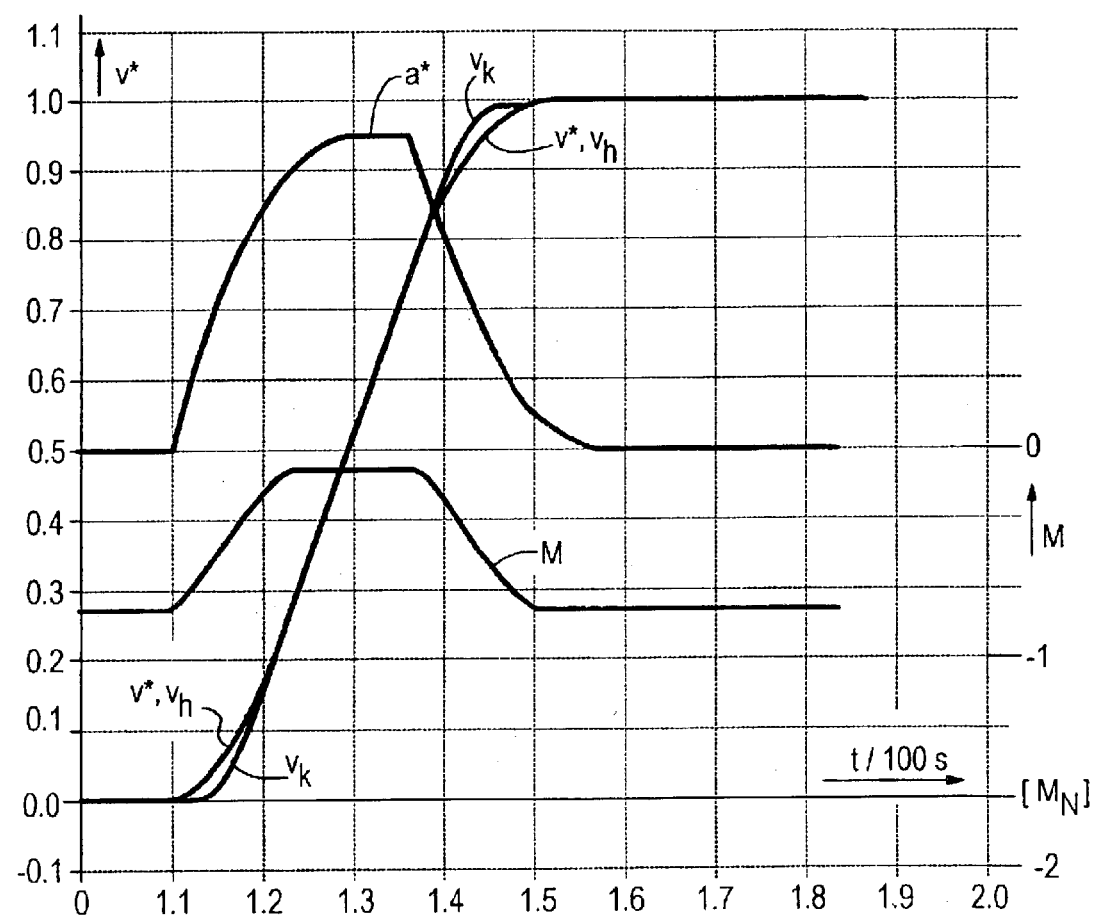
FIG. 3 illustrates a graph in which the true belt speed at the tail and at the head, the setpoint value of the belt speed, the acceleration, and the motor torque are likewise plotted against the time.
Figure 4:
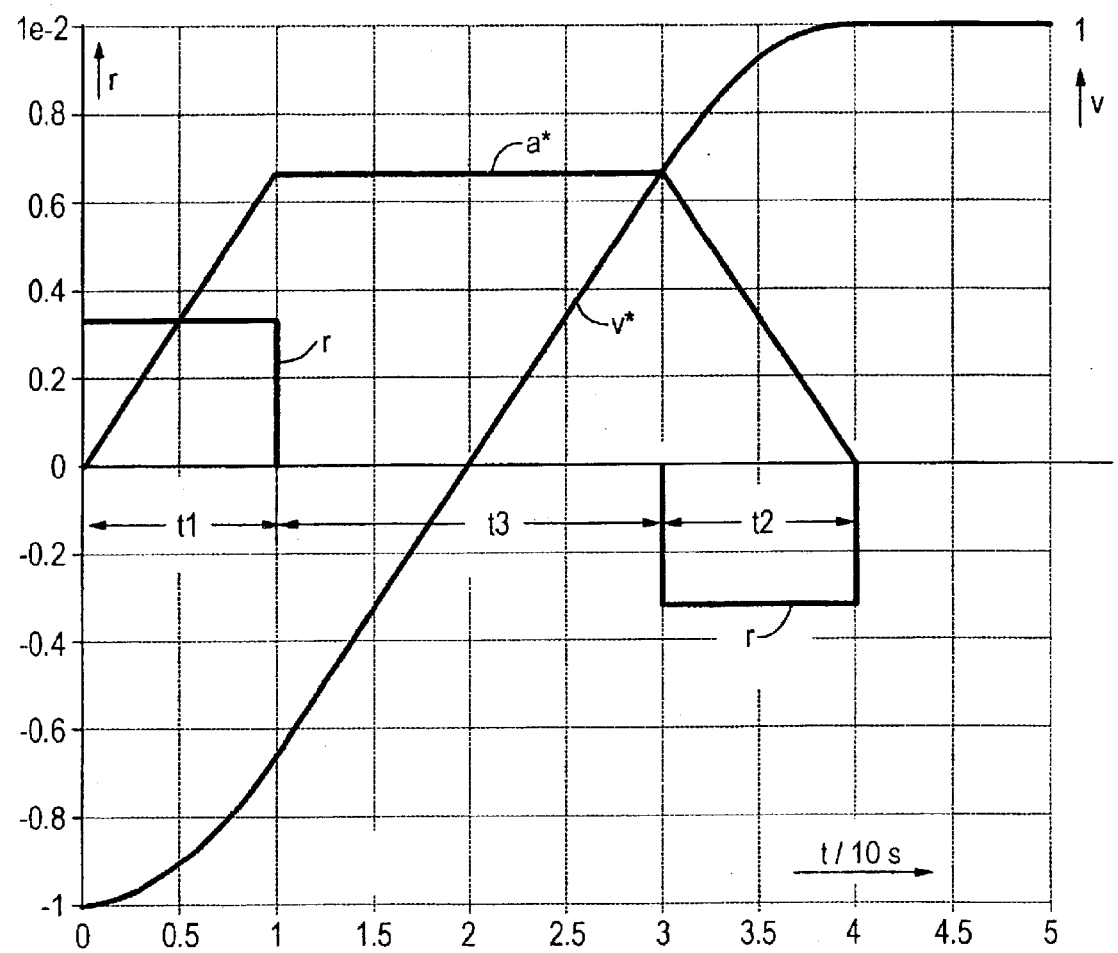
FIGS. 4 and 5 in each case illustrate graphs analogous to FIGS. 2 and 3 using a method known from the prior art for controlling the run-up of a conveyor belt.
Figure 5:
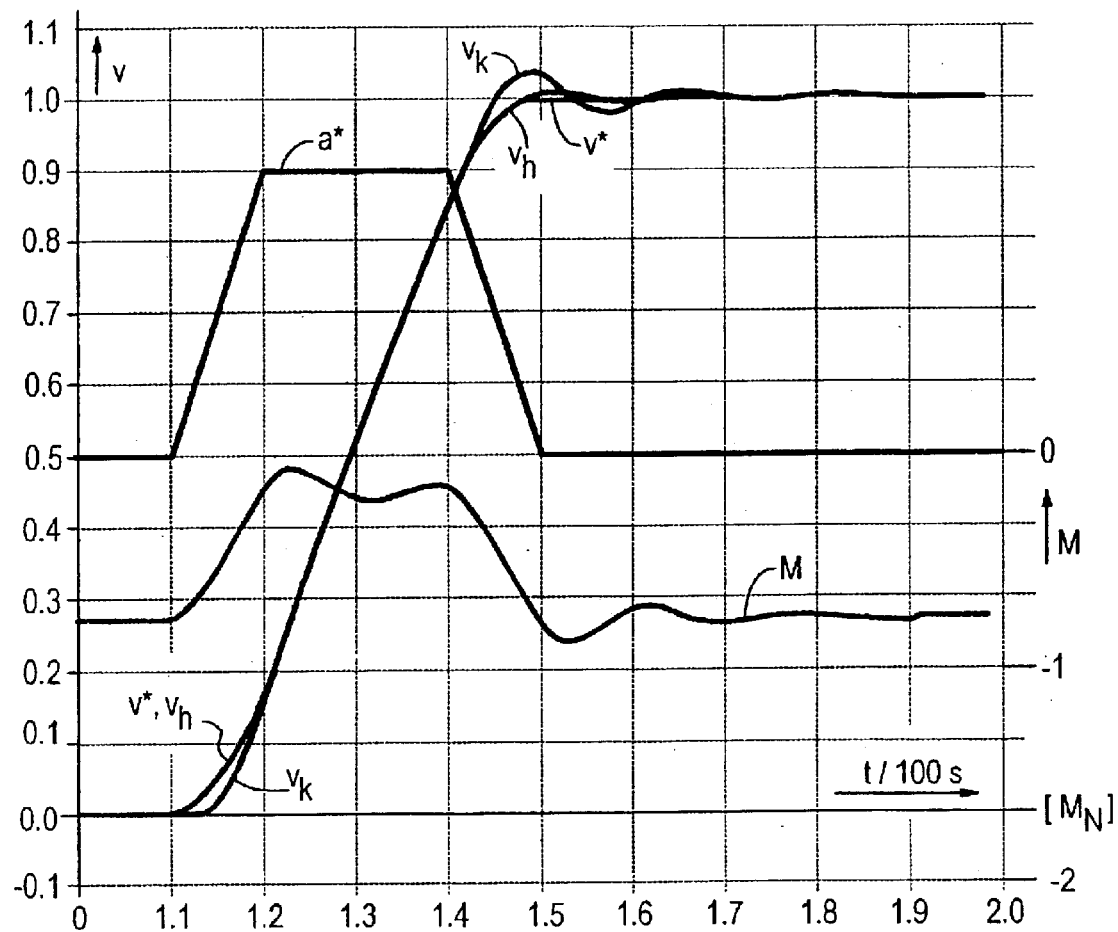

In FIG. 3, by using the plotted curves for the motor torque M and the actual speed of a conveyor belt at the head vk and at the tail vh, it can be seen that belt and torque fluctuations are virtually suppressed. The relationships represented in FIG. 3 reproduce the run-up operation for a conveyor belt on a typical belt system with a total jerk time of 20 seconds and a maximum standardized acceleration of 0.05 s−1.

We claim:

1. A method for controlling the run-up of a conveyor belt comprising increasing a setpoint value of the belt's speed with an increasing acceleration in a first time interval, and with a decreasing acceleration in a second time interval, plotting a curve of the increasing acceleration against time which has a positive curvature in the second interval, a second time derivative of the acceleration in the first and the second time interval being at least approximately constant and at least approximately of like absolute value and of opposite sign.

2. The method according to claim 1, wherein a first time derivative of the acceleration is at least approximately equal to zero at the end of the second time interval.

3. The method according to claim 1, wherein the second time derivative of the acceleration is positive in the second time interval.

4. The method according to claim 1, wherein the second time derivative of the acceleration is negative in the first time interval.

5. The method according to claim 1, further comprising increasing a rotational speed setpoint, between the first time interval and the second time interval, with an at least approximately constant acceleration in a third time interval.

6. An apparatus for a conveyor belt, comprising a motor for driving a driving drum and a control device for controlling a setpoint value of the belt speed during run-up of the conveyor belt, such that acceleration increases continuously in a first time interval and decreases continuously and with a positive curvature in a second time interval, a second time derivative of the acceleration in the first and in the second time interval being in each case at least approximately constant and at least approximately of like absolute value and of opposite sign.

7. The apparatus according to claim 6, wherein a first time derivative of the acceleration is at least approximately equal to zero at the end of the second time interval.

8. The apparatus according to claim 6, in which the second time derivative of the acceleration is positive in the second time interval.

9. The apparatus according to claims 7 and 8, wherein the second time derivative of the acceleration is negative in the first time interval.

* * * * *